United States Patent [19]

Brasseur et al.

[11] Patent Number: 5,598,153
[45] Date of Patent: Jan. 28, 1997

[54] CAPACITIVE ANGULAR DISPLACEMENT TRANSDUCER

[76] Inventors: Georg Brasseur, Esslergasse 20, A-1130 Wien; Thomas Eberharter, Sebastian Kneipp Gasse 10/6, A-1020 Wien, both of Austria

[21] Appl. No.: 87,261

[22] Filed: Jul. 8, 1993

[51] Int. Cl.$^6$ .................................................. G08C 19/10
[52] U.S. Cl. ................... 340/870.37; 340/671; 324/660; 324/663; 318/662
[58] Field of Search ................................. 340/670, 671, 340/672, 870.37, 870.42; 318/652, 653, 662, 254; 324/658, 660, 662, 725, 663

[56] References Cited

U.S. PATENT DOCUMENTS

| | | | |
|---|---|---|---|
| 3,683,402 | 8/1972 | Parnell | 324/660 |
| 3,732,553 | 5/1973 | Hardway, Jr. | 340/870.37 |
| 3,845,377 | 10/1974 | Shimotori | 340/870.37 |
| 4,092,579 | 5/1978 | Weit | 340/870.37 |
| 4,238,781 | 12/1980 | Vercellotti et al. | 340/870.37 |
| 4,864,295 | 9/1989 | Rohr | 340/870.37 |
| 5,077,635 | 12/1991 | Bollhagen et al. | 324/725 |
| 5,099,386 | 5/1992 | Stokes et al. | 324/725 |

FOREIGN PATENT DOCUMENTS

| | | |
|---|---|---|
| 0258725A2 | 3/1988 | European Pat. Off. . |
| 0459118A1 | 12/1991 | European Pat. Off. . |
| 2349125 | 11/1977 | France . |
| 2457003 | 12/1980 | France . |
| 3328421A1 | 2/1984 | Germany . |
| 213081 | 8/1984 | Germany . |
| 3538455A1 | 4/1986 | Germany . |
| 3711062A1 | 10/1988 | Germany . |
| 2176013 | 12/1986 | United Kingdom . |

*Primary Examiner*—John K. Peng
*Assistant Examiner*—Daniel J. Wu
*Attorney, Agent, or Firm*—Nikaido, Marmelstein, Murray & Oram LLP

[57] ABSTRACT

Measuring device for the measurement of a rotor angle including a capacitive angular displacement transducer generating an output that varies with an angular displacement of a shaft. A first stator has a plurality of transmitting electrodes to generate electric fields within the transducer due to excitation signals applied to the plurality of transmitting electrodes which are electrically conducting circle sectors of equal area which are electrically isolated from each other and which completely cover a rotational angle of $2\pi$ on the first stator. A second stator is parallel and coaxial to the first stator and includes a conductive ring electrode receiving excitation from the first stator and producing an electric output signal. A rotor is located coaxially, parallel to the first stator and the second stator. The rotor has at least one rotor blade in the form of circle sectors, the central angle of each rotor blade being equal to at least the sum of the central angles of two sectors of the first stator. A generator delivers output voltages to the sectors. An evaluation unit is connected to the second stator and includes at least one separation unit connected via an amplifier to the second stator and a following signal processing unit. The generator provides at least two different electrically separable output signals. The separation unit separates the received input signal with respect to the excitation signals into angle dependent transfer functions. The following signal processing unit determines the rotor angle from the angle dependent transfer functions.

10 Claims, 3 Drawing Sheets

5,598,153

CAPACITIVE ANGULAR DISPLACEMENT TRANSDUCER

BACKGROUND OF THE INVENTION

The invention refers to a capacitive angular displacement transducer for the measurement of a rotor angle. It comprises three plates, two parallel stator plates and a rotor plate which is coaxially mounted between, and parallel to the first and second stator plate on a rotatable shaft. The first stator plate is divided into several conductive circle sectors of equal area which are electrically isolated from each other and fully cover a rotor angle of $2\pi$ and are excited throughout with a plurality of electrical signals. The second stator plate which is parallel to the first consists of a concentric circle electrode for the generation of an electrical signal.

Furthermore, the invention refers to a measuring device for the measurement of a rotor angle which includes a capacitive angular displacement transducer with a generator for generating voltage signals that are connected to the circle sections of the first stator plate and an evaluation unit which is connected to the second stator plate.

Such a capacitive angular displacement transducer is described in U.S. Pat. No. 3,845,377. Its simple construction and simple signal processing unit which uses a charge amplifier, allows cost effective production. The signal evaluation is based on the phase difference between transmitted and received voltages on the sensor electrodes but without any error compensation mechanisms during the measurement. The major disadvantage of this sensor is that for most applications it is not precise enough.

DE-A-37 11 062 shows a further capacitive angular displacement transducer. This unit uses two identical stators each of which consists of excitation electrodes in the form of ring segments and a circular output electrode. The rotor, which is positioned between the two stators is also a combination of ring and circle segments. A configuration of this type on the one hand reduces the error due to rotor axis offset; on the other hand, however, it has the disadvantage that the close neighborhood of the excitation and the receiving electrodes causes interference between the transmitted and the received signals. Furthermore, a dielectric rotor may not be used resulting in an unchanged error susceptibility to axis tilt.

Error compensation by means of configuration in an angular displacement transducer especially on stator offset is suggested in U.S. Pat. No. 4,238,781 which also refers to angular displacement transducers with phase evaluation. In this solution, major disadvantages occur due to not taking into account stray fields into account and the necessity of two amplification units by which the precision of such a sensor is highly reduced. The method of including a multiplexer in the signal processing unit also results in a low precision angular displacement transducer since the input cables carry disturbing stray capacity.

Partial error compensation in capacitive angular displacement transducers is made possible by placing multiple electrodes on the circumference of the transducer as demonstrated in DD-A-13 213 081 especially for axis offset. Since this configuration only consists of two opposing plates, the output signal is sensitive to variation in distance between said plates. Therefore, it is only possible to evaluate the phases. In addition, this configuration leads to an unwanted coupling of the excitation signals to the output signal. A further disadvantage is that the full scale range of the transducer is less than $2\pi$.

It is clear that in the field of linear and angular displacement transducers a higher resolution and accuracy can be obtained both through more specific configurations as well as a more complex signal processing. EP-A-258 725 for example demonstrates that the combination of fine and rough tracks enables high precision. The necessary electronics are however quite complex. Furthermore, such a capacitive angular displacement transducer has the following disadvantages: the individual segments of the fine track are so small that their behaviour is significantly influenced by stray fields. This leads to difficulties in achieving sinusoidal signals. This configuration requires a larger diameter as well. Due to the segmentation of the receiving electrodes, the sensitivity to axis tilt is low, but two amplifiers for each system are needed so that equal system behaviour is difficult to achieve. Since the active sector areas of both stators and the rotor are located on corresponding ring segments, the coupling varies with axis offset. On the fine track, error compensation is achieved by an at least double opposing configuration which is used primarily in optical encoders. Since four amplifiers are necessary, the placement of the electronics at a greater distance from the sensor is difficult. High enviromental temperatures necessitate the use of special and expensive amplifiers that can withstand high operating and environmental temperatures.

Among the encoders that work with electrostatic capacity, there are also those, as for example described in DE-A-35 38 455, which use a non-segmented and rotatable coupling electrode for signal transmission to the fixed output electrode. The coupling electrode is connected to the receiver electrode facing the transmitter electrode mounted on a fixed disc. This method does not substantially improve the insensitivity to axis tilt but the coupling electrode on the second side of the rotor eliminates the reciprocal influence of the pattern generator and the signal processing unit. Due to the relatively fine structure of the configuration, a reduction in transducer size is difficult while maintaining precision. Excitation i.e. providing the plurality of control voltages is very complex due to the large number of signals.

OBJECTS AND SUMMARY OF THE INVENTION

One of the objects of this invention is to construct a capacitive angular displacement transducer which eliminates the disadvantages of known angular displacement transducers and is insensitive to axis tilt, axis offset or an imperfect parallelism of stators, thereby enabling improved accuracy through error compensation. The angular displacement transducer should be simple in structure, compact and low cost.

This problem is solved by means of a capacitive angular displacement transducer of the type described above whereby the rotor of the system consists of one or more rotor blades in the form of circle sectors, whereby the centre angle of each circle sector is equal to the sum of the centre angles of two circle sectors on the first stator. Furthermore, the above mentioned measurement unit is a part of the new capacitive angular displacement transducer, whereby the generator can generate at least two different time dependent and separable excitation signals or at least two time-delayed digital signals, and an evaluation unit capable of processing a single input signal from the receiver electrode as well as at least one separator unit, and a signal processing unit delivering the rotor angle phi. The separation unit is designed to separate the input signal generated by the excitation signals to measurement values which are then used to calculate the rotor angle.

BRIEF DESCRIPTION OF THE DRAWINGS

Various embodiments of the invention shall now be described and shown in the attached figures.

DETAILED DESCRIPTION OF PREFERRED EMBODIMENTS

Figure 1:
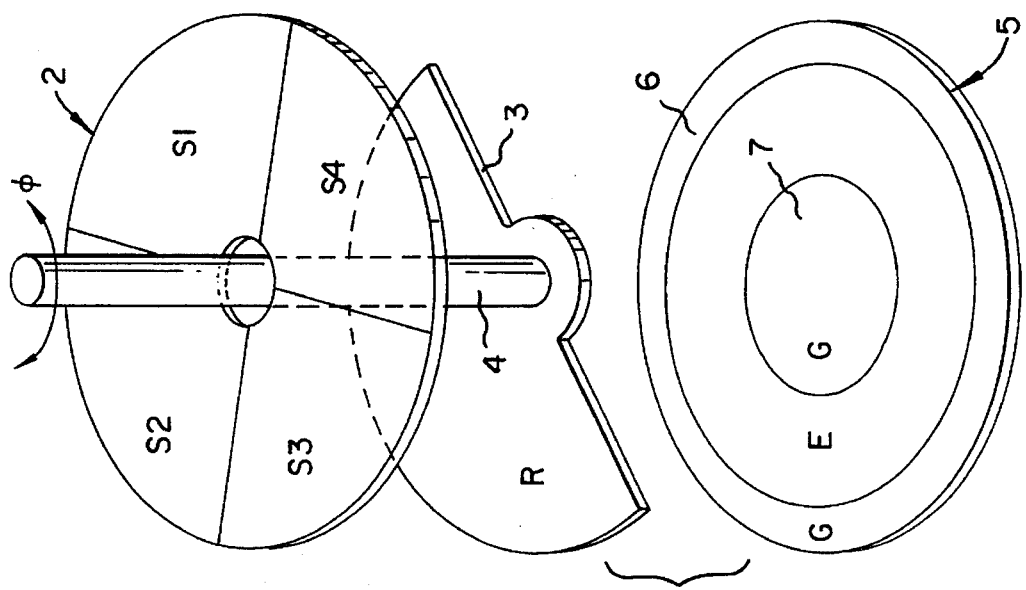
In FIG. 1 a type is shown with a stator consisting of four 90 degree sectors in schematic depiction, FIG. 1a a type with a stator consisting of eight sectors,.

FIG. 1 shows the basic structure of a capacitive angular displacement transducer according to the invention. The first stator 2 consists of an isolating material coated with four electrically conducting sectors S1, . . . S4 which are isolated from each other and each have an aperture angle of about $\pi/2$. The sectors S1, . . . S4 can be excited individually. Specific excitation or control signals are described below. A rotor 3 is attached to an axis 4 and can freely rotate between the first stator 2 and the second stator 5. The stators are coaxial and parallel to each other. The rotor 3 consists of a dielectric material, can, however, alternately be made out of metal. To minimise the effect of axis tilt, the metal area of the rotor 3 should consist of small partial areas isolated from each other. A possible solution is the use of through hole plated metal coated isolators. It is evident that the rotor 3 has to be constructed in a way, that the desired distribution of the specific capacity distribution between the stators 2 and 5 is achieved. Such a distribution could also have been achieved by coating a full circular plate (not shown) instead of a semicircular rotor blade of dielectric material.

The second stator 5 consists of an isolated disc coated with three concentric circles isolated from each other. The circles 6 and 7 are used as shielding devices and are marked with G. The receiver electrode is marked with E. The receiver electrode E has a smaller diameter than either of the transmitting electrodes, S1, . . . S4, or the rotor R3. This was done to reduce the errors due to axis offset..

Figure 2:
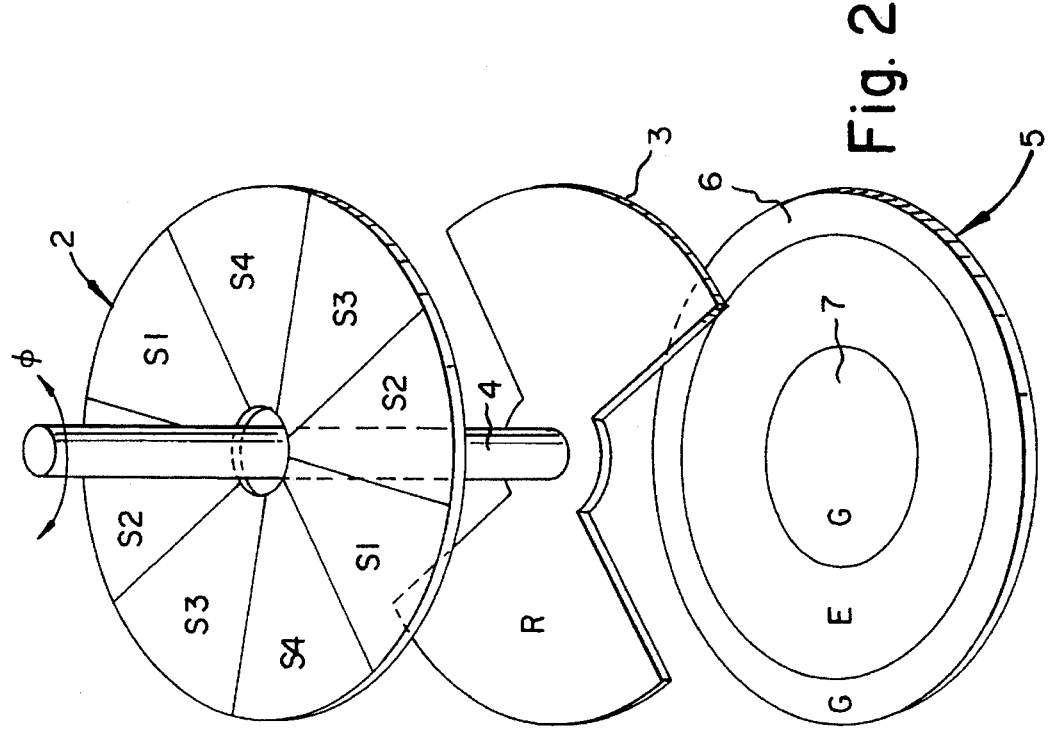
FIG. 2 shows an other type with eight 45 degree sectors on the stator.

The configuration of the position sensor in FIG. 2 is similar to the one in FIG. 1, but has a higher error compensation due to a doubling of the number of transmitting sectors S1, . . . S4. The period for a mechanical rotor angle $\Phi$ is thereby reduced to $\pi$. This results in two output signal periods at the receiver electrode per mechanical rotation.

As shown in FIGS. 1 and 2, the size, and shape of rotor 3 is dependant upon the number of sectors S1, . . . S4. In FIG. 1 (the type with four sectors), the rotor is semicircular, whereas the type shown in FIG. 2 with eight sectors has two opposing rotors segments in quarter circle form resulting in one rotor again having the same area as two neighbouring sectors on the stator.

The sectors S1, . . . S4 are subjected to excitation or control signals which result in corresponding charge on the common output electrode E so that their stator electrodes can also be called transmitter and receiver electrodes.

Figure 3:
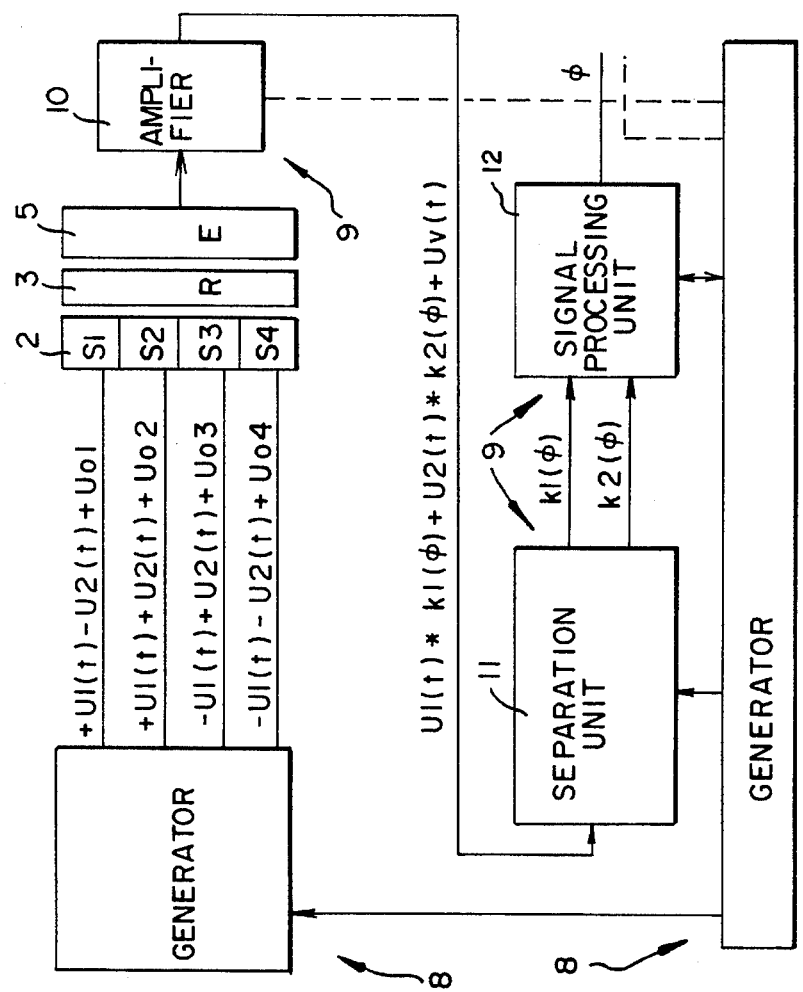
FIG. 3 shows a block diagram of the electronic principle for a type with four or eight sectors as shown in FIGS. 1 and 2 in accordance with the invention.

FIG. 3 shows a generator 8 which supplies different signals to the four sectors S1, . . . S4 and an evaluation unit 9 consisting of an amplifier 10, a separation unit 11 and a signal processing unit 12. The signals are composed as shown in FIG. 3 whereby Uo1 to U04 are random offset voltages. The voltages U1(t) and U2(t) have to be different in order to supply at least two different excitation signals which can however be separated from each other electronically due to their different time dependent behaviour.

Hereby preferably such signals should be used whose alternating-current components are orthogonal in the time domain. Such signals are e.g. under certain phase relations sine and cosine shaped or show properties according Walschfunctions or are signals with a rational frequency ratio. A further simple separation consists in the successive emission of the excitation signals. As described in FIG. 3, the four excitation signals connected to the sectors S1, . . . S4 result in an rotor angle dependant charge being induced in the receiver electrode (stator 5). This signal is transformed into a voltage of corresponding amplitude by e.g. an amplifier 10 and has the form of k1($\Phi$) * U1(t)+k2($\Phi$) * U2(t). The amplified signal is separated into two components by a separation unit 11 and two corresponding transfer functions k1($\Phi$) and k2($\Phi$) are determined. As separation unit usual means such as filters and time windows may be used.

Due to the compensation method, the amplitude of the excitation signals may be changed in such a way that the received signals are almost zero. An angle $\Phi$ may then be determined from the amplitudes of the four excitation signals. An important aspect is that only one receiving device is used for both signal components, whereby an almost exact compensation of the interference signals becomes possible.

A signal processing unit 12 finally determines the mechanical angle $\Phi$ from k1($\Phi$) and k2($\Phi$). As an additional electronic error compensation, the correlation |k1($\Phi$)|+ |k2($\Phi$)|=constant may be used. An offset error of the factors k1($\Phi$) and k2($\Phi$), possibly resulting from geometric errors may largely be compensated for by auto calibration of the sensor. This necessitates at least one measurement value per quadrant (electrical period) therefore at least four measurement values in total. An external angle reference is not necessary. Auto calibration is also possible under normal operating conditions but the measurement values should not be taken at rotor angle positions where the rotor blades are at the edges of the transmitting segments.

Figure 4:
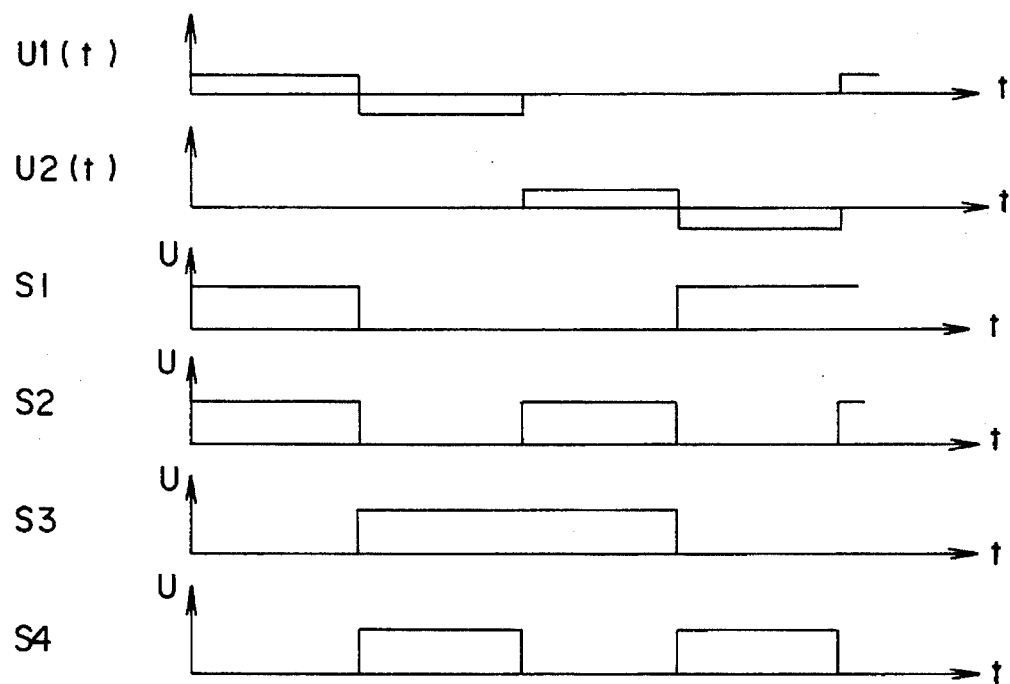
FIG. 4 shows an example for specific signal forms with time shifted excitation patterns U1(t) and U2(t) for transducer types with four or eight sectors according to FIGS. 1 and 2.

FIG. 4 shows a possible special configuration of signal forms with time shifted excitation signals U1(t) and U2(t) for a set up as in FIGS. 1 and 2 and electrical switching as in FIG. 3. The positive voltages U of each pair of sectors S1, S2; S3, S4; S2, S3; and S1, S4 are also shown in this diagram. This shows that each random pair carries positive voltage exactly once in a measurement cycle.

The transfer functions k1($\Phi$) and k2($\Phi$) correspond to physical capacities in FIG. 3 when they are amplified, which change linear with $\Phi$ for set ups according to FIGS. 1 and 2. They may be determined by measuring total capacity as follows:

U2=0; to S1 and S2 with a sum capacity of C1+U1 is applied, to S3 and S4 with a sum capacity of C2 -U2 is applied resulting in a total capacity on E of (C1 - C2) which is equal to k1 in FIG. 3. U1=0; to S1 and S2 with a sum capacity C3+U2 is applied, to S4 and S1 with a sum capacity of C4 -U2 is applied, resulting in a total capacity on E of (C3 - C4) which correspond to k2 in FIG. 3.

Figure 5:
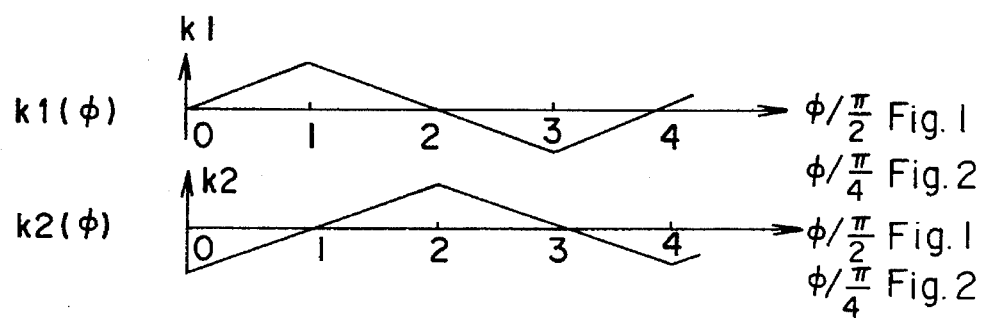
FIG. 5 shows the time invariant transfer functions k1($\Phi$) and k2($\Phi$) for the configuration according to FIGS. 1 and 2.

FIG. 5 shows the corresponding functions k1($\Phi$) and k2($\Phi$) to the above physical explanation of the transfer functions. It can be seen that the functions k1(Φ) and k2(Φ) in this configuration are symmetrical triangular curves which in relation to each other show an electric phase shift of π/2 and a quarter mechanical cycle of π/2 for a set up as shown in FIG. 1 or π/4 for a set up as shown in FIG. 2.

Figure 1A:
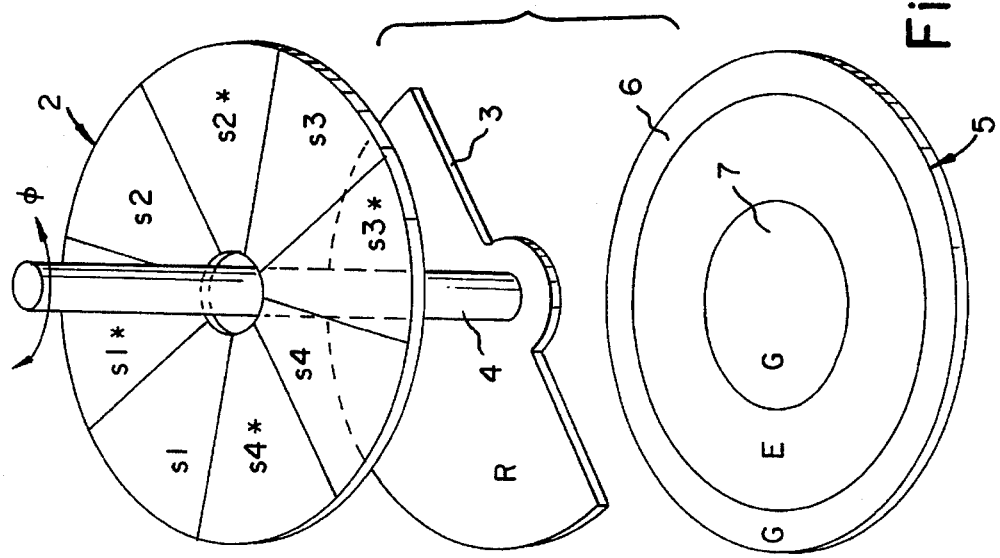

FIG. 1a shows an embodiment with improved linearity. To improve the linearitiy of the sensor when the edge of the rotor blade is close to a boundary of one of the transmitting electrodes S1, ... S4 of the first stator 2 each transmitting electrode consists of two equally shaped transmitting electrodes s1, s1*, ... s4, s4* with half of the central angle of the original transmitting electrodes and each output of the generator 8 is connected to two adjacent transmitting electrodes e.g. s1+s1*, ... s4+s4* or s1*+s2, ... s4*+s1). Whenever the edge of a rotor blade comes close to a sector border of one of the transmitting electrodes the pattern generator is connected to the transmitting electrodes in a way that the edge of the rotor blade is more or less in the middle of two adjacent and electrically connected electrodes. Thus measurement errors appearing whenever the edge of the rotor blade crosses the border between two sectors which are excited with different signals from the pattern generator 8 are avoided.

What is claimed is:

1. Measuring device for the measurement of a rotor angle Φ including a capacitive angular displacement transducer for generating an output that varies with an angular displacement Φ of a shaft, comprising:

a first stator having a plurality of transmitting electrodes used to generate electric fields within the transducer due to excitation signals applied to said plurality of transmitting electrodes, said plurality of transmitting electrodes being a number of electrically conducting circle sectors of equal area which are electrically isolated from each other and completely cover a rotational angle of 2π on said first stator;

a second stator which is parallel and coaxial to said first stator comprising a conductive ring electrode for receiving excitation from said first stator and producing an electric output signal;

a rotor mounted on an axis and located parallel and coaxial between said first stator and said second stator, said rotor having at least one rotor blades in the form of circle sectors, wherein the central angle of each rotor blade is equal to at least the sum of the central angles of two sectors of said first stator a generator delivering output voltages to the sectors and an evaluation unit connected to said second stator;

said generator providing at least two different electrically separable output signals;

said evaluation unit using one single input and comprising at least one separation unit connected via an amplifier to said second stator;

said at least one separation unit being capable to separate the received input signal with respect to the excitation signals into angle dependent transfer functions, and a following signal processing unit determining the rotor angle from said angle dependent transfer functions.

2. A capacitive angular displacement transducer as claimed in claim 1 wherein said conductive ring electrode of second stator comprises an outer ring electrode and an inner ring electrode isolated from a receiver ring electrode which serves as a receiver electrode.

3. A capacitive angular displacement transducer as claimed in claim 1 or 2 wherein said first stator has four circle sectors equal in area and said rotor has a semicircular rotor blade.

4. A capacitive angular displacement transducer as claimed in claim 1 or 2 wherein said first stator has eight circle sectors equal in area and said rotor has two opposing across-axis quarter circle rotor blades.

5. A capacitive angular displacement transducer as claimed in claim 1, wherein said rotor is made of one of a dielectric material, of metal and of a through hole plated partially metal coated isolator.

6. A measuring device as claimed in claim 1, wherein said generator generates said excitation signals which are orthogonal in the time domain.

7. A measuring device as claimed in claim 1 or 6 in which said generator has four outputs connected to said four sectors of said first stator whereby said generator delivers the signal $(U_1-U_2)(t)$ to the first sector, the signal $(-U_1+U_2)(t)$ to the second sector, the signal $(U_1+U_2)(t)$ to a third sector and the signal $(-U_1+U_2)(t)$ to the fourth sector.

8. A measuring device as claimed in claim 7 where said generator produces two shifted rectangular pulse trains $(U_1(t), U_2(t))$.

9. A measuring device as claimed in claim 1, including said capacitive angular displacement transducer wherein the central angle of said rotor blades is equal to the sum of the central angles of four sectors of said first stator and each two adjacent sectors are connected to the same output of said generator.

10. A measuring device as claimed in claim 6, wherein said signals which are orthogonal in the time domain are selected from the group consisting of signals which are sine shaped, signals which are cosine shaped, signals which correspond to Walshfunctions, and signals which show rational frequency ratios.

* * * * *